(12) United States Patent
Leak et al.

(10) Patent No.: US 6,817,285 B2
(45) Date of Patent: Nov. 16, 2004

(54) MACHINES FOR MAKING SUSHI ROLLS

(75) Inventors: Peter Leak, Saffron Walden (GB); Bruce Stanley John Hutchison, Cambridge (GB); Alasdair Max Paul Barnett, Cambridge (GB)

(73) Assignee: Sushi Machines International Limited, Cambridge (GB)

(*) Notice: Subject to any disclaimer, the term of this patent is extended or adjusted under 35 U.S.C. 154(b) by 0 days.

(21) Appl. No.: 10/425,011

(22) Filed: Apr. 28, 2003

(65) Prior Publication Data
US 2004/0025713 A1 Feb. 12, 2004

(30) Foreign Application Priority Data
May 2, 2002 (GB) .............................................. 0210071

(51) Int. Cl.$^7$ ........................... A21C 9/00; A21C 11/00; A23P 1/00; B29C 69/00
(52) U.S. Cl. ..................... 99/450.6; 99/450.2; 99/450.7; 425/112; 425/383
(58) Field of Search .............................. 99/450.1, 450.2, 99/450.4, 450.6, 450.7, 426, 433, 432; 425/112, 383, 110, 319, 436 R

(56) References Cited

U.S. PATENT DOCUMENTS

| 4,687,670 A | * | 8/1987 | Rodriguez ................... 426/297 |
| 5,870,948 A | * | 2/1999 | Ono .......................... 99/450.6 |
| 2003/0097938 A1 | * | 5/2003 | Young ....................... 99/450.1 |

* cited by examiner

Primary Examiner—Reginald L. Alexander
(74) Attorney, Agent, or Firm—Barnes & Thornburg LLP

(57) ABSTRACT

A machine for making sushi rolls has a support base (10) supporting a foldable plate (12) made of four strips of metal pivotally mounted one to the next along three parallel hinge lines (17). Four frame members (13a, 13b, 13c, 13d) can be assembled to make a rectangular frame which is locatable on the plate (12) in either of two possible orientations, one of which defines a shallow recess and the other of which defines a deep recess to enable a thinner or thicker layer of rice to be applied to the plate which, after removal of the frame is folded to form a sushi roll having a thinner or thicker layer of cooked rice, so that the machine can produce sushi rolls with different bulks of filling.

15 Claims, 9 Drawing Sheets

US 6,817,285 B2

MACHINES FOR MAKING SUSHI ROLLS

FIELD OF THE INVENTION

This invention relates to machines for making sushi rolls.

BACKGROUND TO THE INVENTION

A known machine for making sushi rolls, for example as disclosed in U.S. Pat. No. 5,910,208, has a foldable plate on which a rectangular frame can be placed to define a recess for receiving a layer of cooked rice. After removing the frame from the plate, and adding to the rice layer a filling such as meat or fish, the plate is folded to form the layer of rice into a sushi roll surrounding the filling. Such machines are limited in the range of volume of filling that can be satisfactorily included, and the invention aims to solve this problem.

SUMMARY OF THE INVENTION

According to the invention there is provided a machine for making sushi rolls, the machine comprising a foldable plate and wall means capable of occupying two different orientations with respect to the plate, in the first orientation the wall means defining a shallow recess for receiving a thinner layer of cooked rice on the plate, and in the second orientation the wall means defining a deep recess for receiving a thicker layer of cooked rice on the plate, so that after removal of the wall means from the plate the latter can be folded to form a sushi roll having a thinner or thicker layer of cooked rice. This enables the machine to produce sushi rolls with different bulks of filling (Maki) in the roll, because a thinner layer of rice layer will provide more space for fillings than a thicker rice layer.

The wall means may comprise a pair of shallow walls to define the shallow recess and a further pair of deeper walls to define the deeper recess. The shallow walls may form the mutually opposite walls of a shallow rectangular frame locatable on the plate and the deeper walls may form the mutually opposite walls of a deeper rectangular frame locatable on the plate. More preferably, however, the wall means comprise four walls defining a rectangular frame which is locatable on the plate in either one of two alternative positions, giving differing depths of recess to define said different orientations.

The four walls may be constituted by four elongate frame members, and the ends of the four frame members may have cooperating formations, such as projections and recesses, to facilitate assembly of the frame. The frame members, when separated from one another, may be grouped into a bundle which is capable of being accommodated within the folded plate, in order to provide a compact and neat storage of the frame members when the machine is not in use.

The machine may carry visual indicator means to indicate to the user which of the two alternative orientations is assumed by the wall means. For example, the plate may have a projection such as a spigot and the wall means may have two recesses one of which receives the spigot in one orientation of the wall means and the other of which receives the spigot in the other orientation of the wall means, the one recess carrying an indicator (such as a numeral representative of a small bulk of filling) and the other recess carrying an indicator (such as a numeral representative of a larger bulk of filling).

The machine may have two plates of different areas when unfolded, each being provided with its respective wall means, the smaller plate and associated wall means being used to make small sushi rolls (Hosomaki) and the larger plate and associated wall means being used to make large sushi rolls (Futomaki). By this means, a single machine can produce sushi rolls made from four different thicknesses of rice.

When the machine has two plates and two frames, the smaller folded plate preferably fits inside the larger folded plate with the wall members of both frames being locatable within the larger folded plate, to provide a compact assembly of the components of the machine when the latter is not in use. The machine preferably has a support base which carries the two folded plates with the wall members therewithin, each plate when unfolded being locatable on the support base.

BRIEF DESCRIPTION OF THE DRAWINGS

A machine according to the invention will now be described, by way of example, with reference to the accompanying drawings, in which.

DETAILED DESCRIPTION

Figure 1:
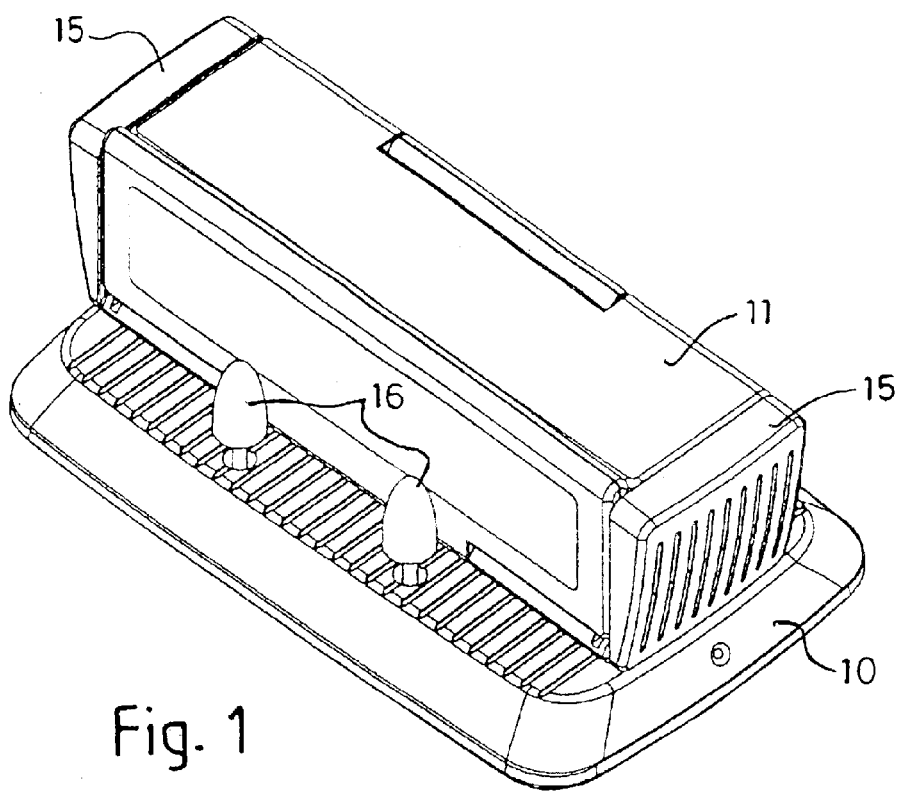
FIGS. 1 and 2 are isometric views of the machine in an inoperative condition.
Figure 2:
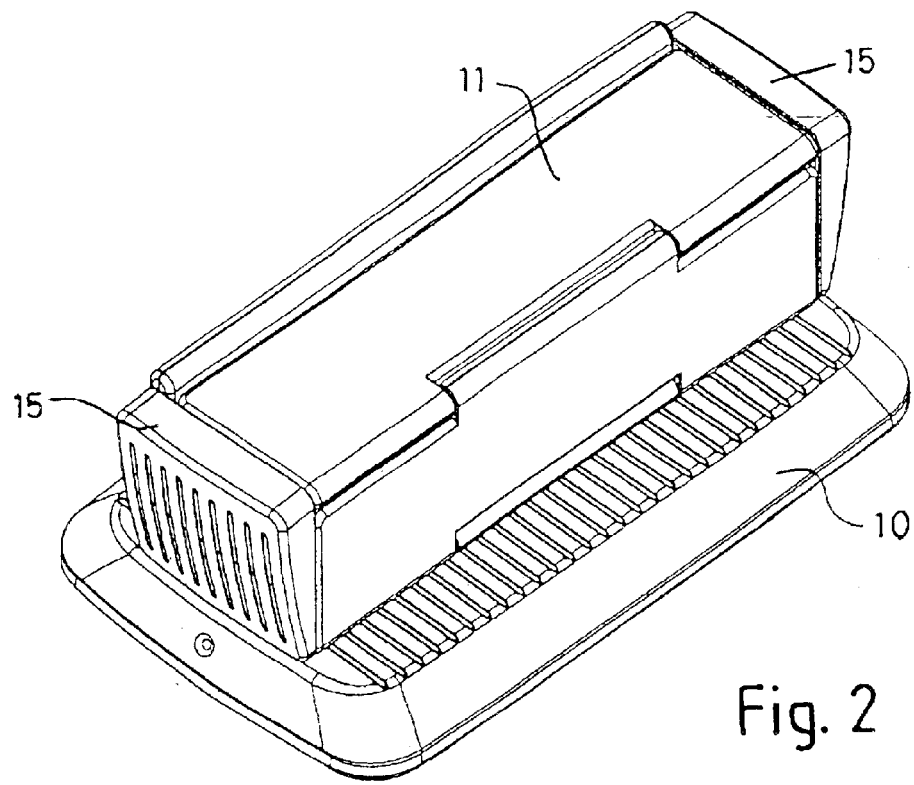
Figure 3:
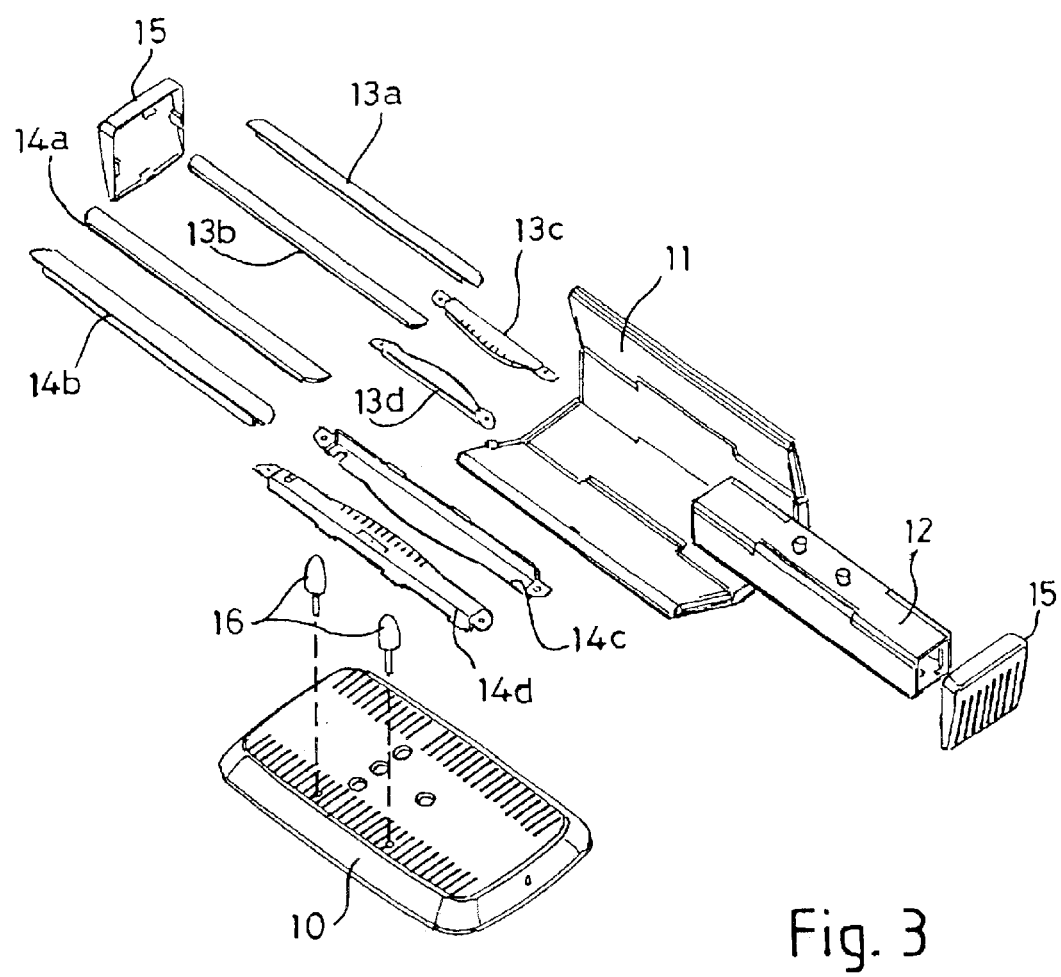
FIG. 3 shows the components of the machine in exploded view.

Referring to FIGS. 1 to 5, the machine has a support base 10 supporting a larger foldable plate 11 in which is nested a smaller foldable plate 12. A first set of four elongate frame members 13a to 13d is located within the smaller folded plate 12 and a second set of four elongate frame members 14a to 14d is located in the space between the folded larger plate 11 and the folded smaller plate 12. Detachable end caps 15 close the ends of the folded plate 11 to retain the components therein. Two handles 16 are detachably inserted into holes in the support base 10.

Figure 4:
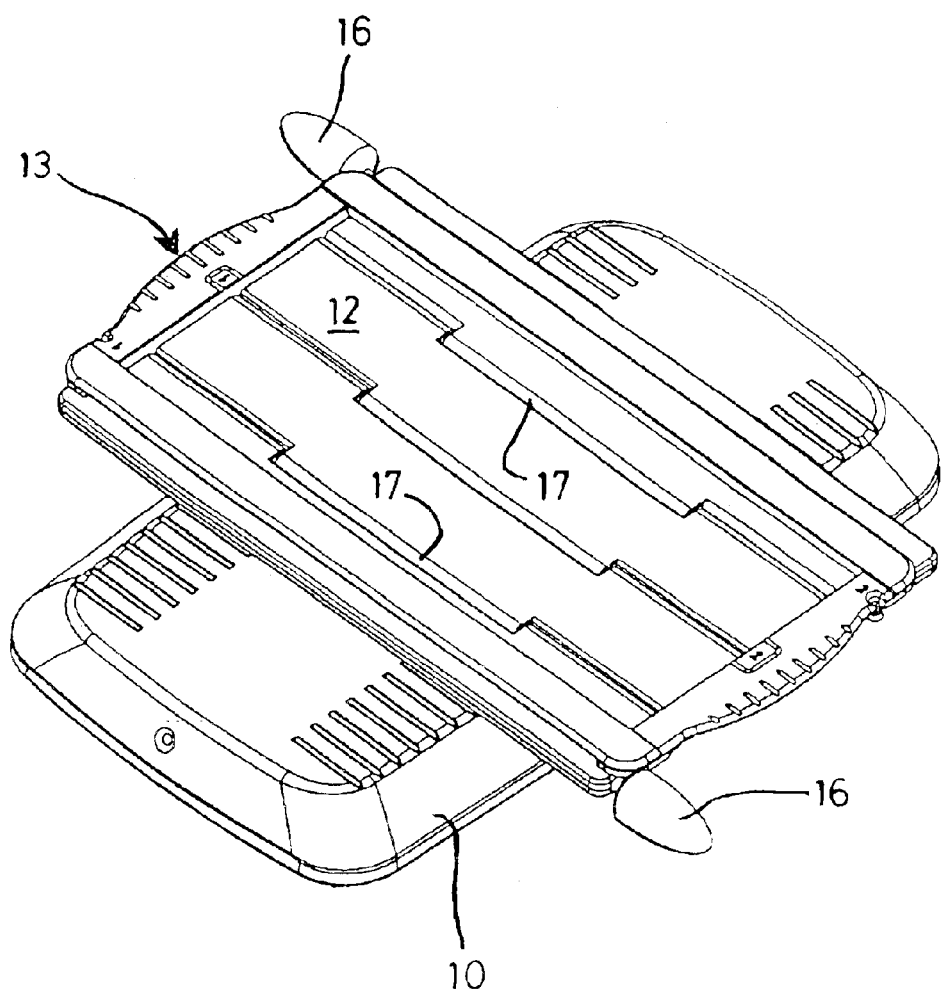
FIG. 4 shows the machine set up to make small rolls (Hosomaki)
Figure 5:
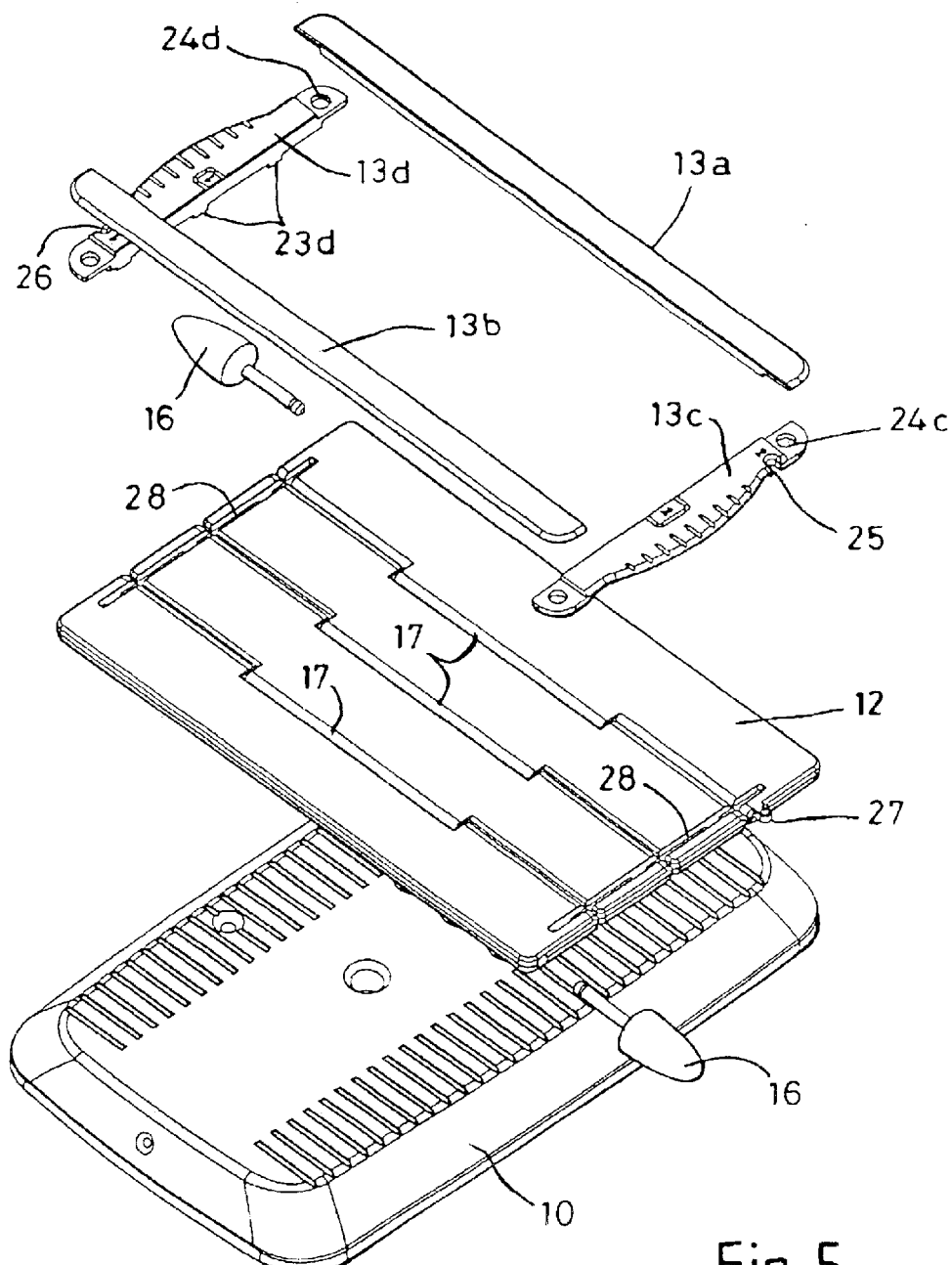
FIG. 5 shows the components of FIG. 4 in exploded view.

The smaller plate 12 is made from four strips pivotally mounted one to the next along three parallel hinge lines 17 so that the plate 12 can be unfolded to occupy its operative position illustrated in FIGS. 4 and 5 in which it presents a substantially horizontal upper surface. Folding movement is facilitated by the two handles 16 which, on removal from the base 10, can be inserted in holes in the outermost strips of the plate 12, as best shown in FIGS. 4 and 5.

Figure 6:
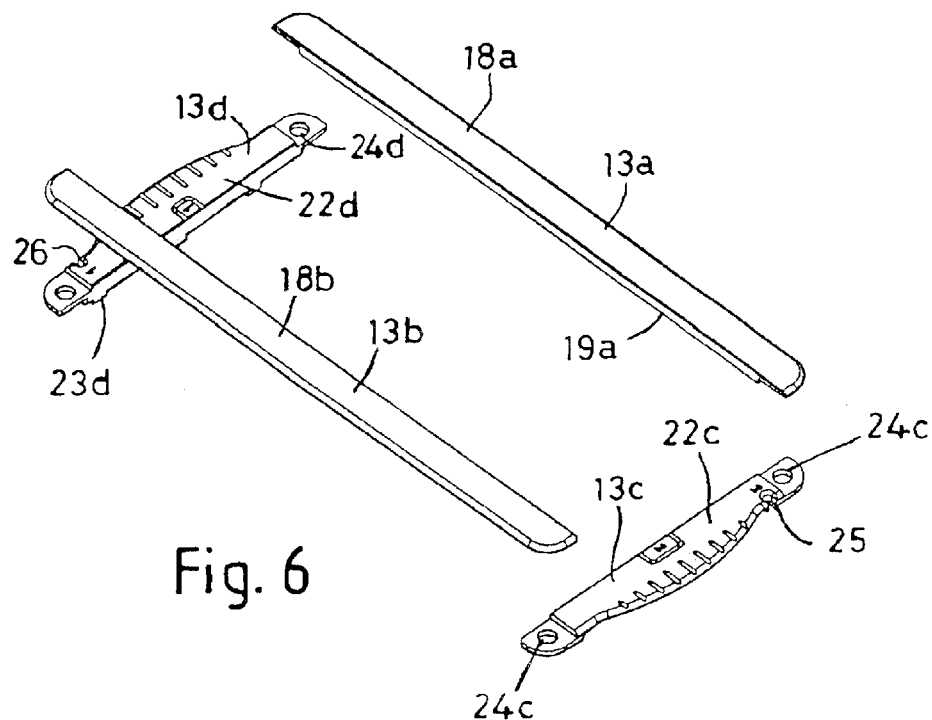
FIGS. 6 and 7 show four frame members of FIGS. 4 and 5.
Figure 7:
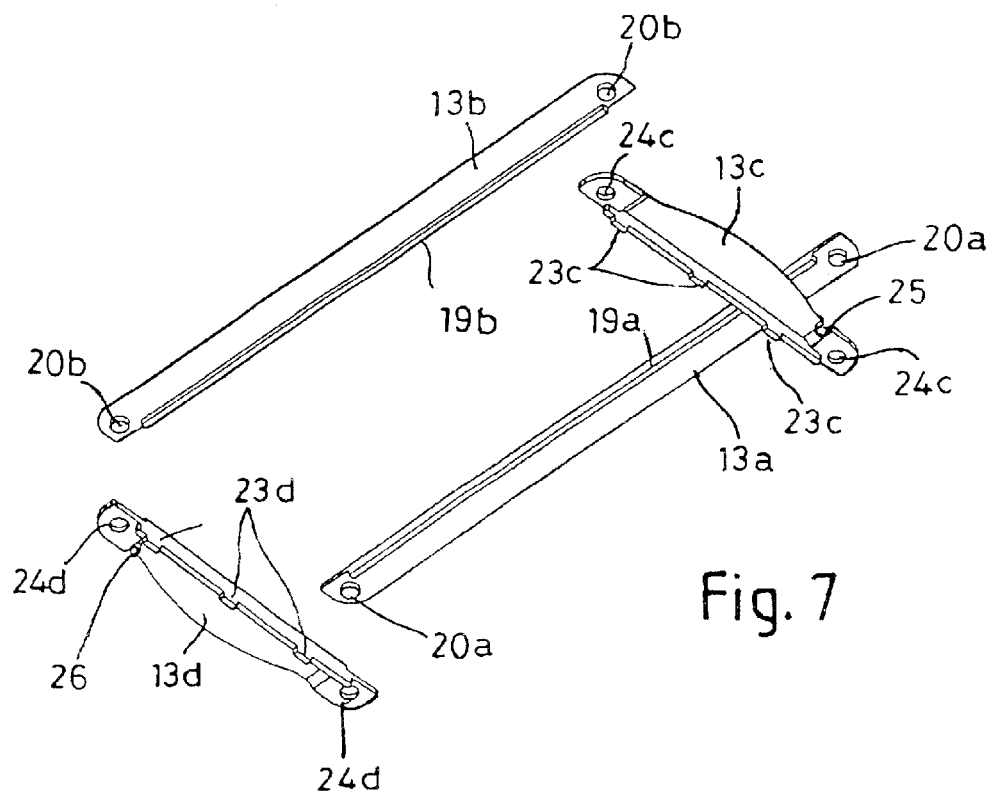

The first set of frame members 13a to 13d, which are locatable on the plate 12 in the manner illustrated in FIG. 4, are illustrated in FIGS. 6 and 7. The two longer frame members 13a, 13b have upper flanges 18a, 18b and depending ribs 19a, 19b. At each end, a circular boss-like protrusion 20a, 20b is formed on the underside of the flange 18a, 18b.

Each shorter side member 13c, 13d has a shaped upper flange 21c, 21d and a depending flange having three spaced lugs 23c, 23d. Each end of each shorter frame member 13c, 13d has a circular hole 24c, 24d to receive one of the projections 20a, 20b so that the four members 13a to 13d can be assembled to form a rectangular frame 13, as illustrated in FIG. 4. When the frame members 13a, to 13d are assembled to form the frame 13, the upper surfaces of the frame members 13a to 13d defined by the flanges are substantially flush.

Adjacent one end, one shorter frame member 13c has a slot 25 with the numeral 2 beside it. The mid point of this shorter frame member 13c also bears the numeral 2. Adjacent its end which is diagonally opposite the slot 25, the other shorter frame member 13d has a further slot 26 with the numeral 1 beside it, and the mid point of this shorter frame member 13d bears the numeral 1.

The slots 25 and 26 are shaped and sized to be a sliding fit with an upstanding spigot 27 (best seen in FIG. 5) which projects from one end of the base plate 12.

The frame 13 (made up of frame members 13a to 13d) is locatable on the plate 12 in either one of two alternative orientations. In a first orientation, the spigot 27 is positioned in the slot 25 and the lugs 23c, 23d are received within complementarily shaped recesses in the plate 12, these recesses being formed in the base of the two parallel grooves 28 visible in FIG. 5. As a consequence, the upper surfaces of the frame 13 are positioned a comparatively short distance above the upper surface of the plate 12, so as to define a comparatively shallow recess. In the second orientation of the frame 13 on the plate 12, the spigot 27 is positioned in the slot 26 and the lugs 23c, 23d do not register with the recesses in the grooves 28 so that the upper surfaces of the frame are spaced a greater distance above the plate 12 so as to define a comparatively deep recess.

The numerals 1 and 2 on the frame members provide a visual indication to the user as to the orientation of the frame. In the first orientation of the frame, the positioning of the numeral 2 beside the spigot 27, and the prominence of the numeral 2 at the centre of the frame member 13c which is positioned at the front of the machine in use, indicates to the user that the frame is in the orientation suitable to make sushi rolls with two fillings. Similarly, the positioning of the numeral 1 beside the spigot 27 indicates to the user that the frame is in the second orientation suitable to make sushi rolls with one filling.

Figure 8:
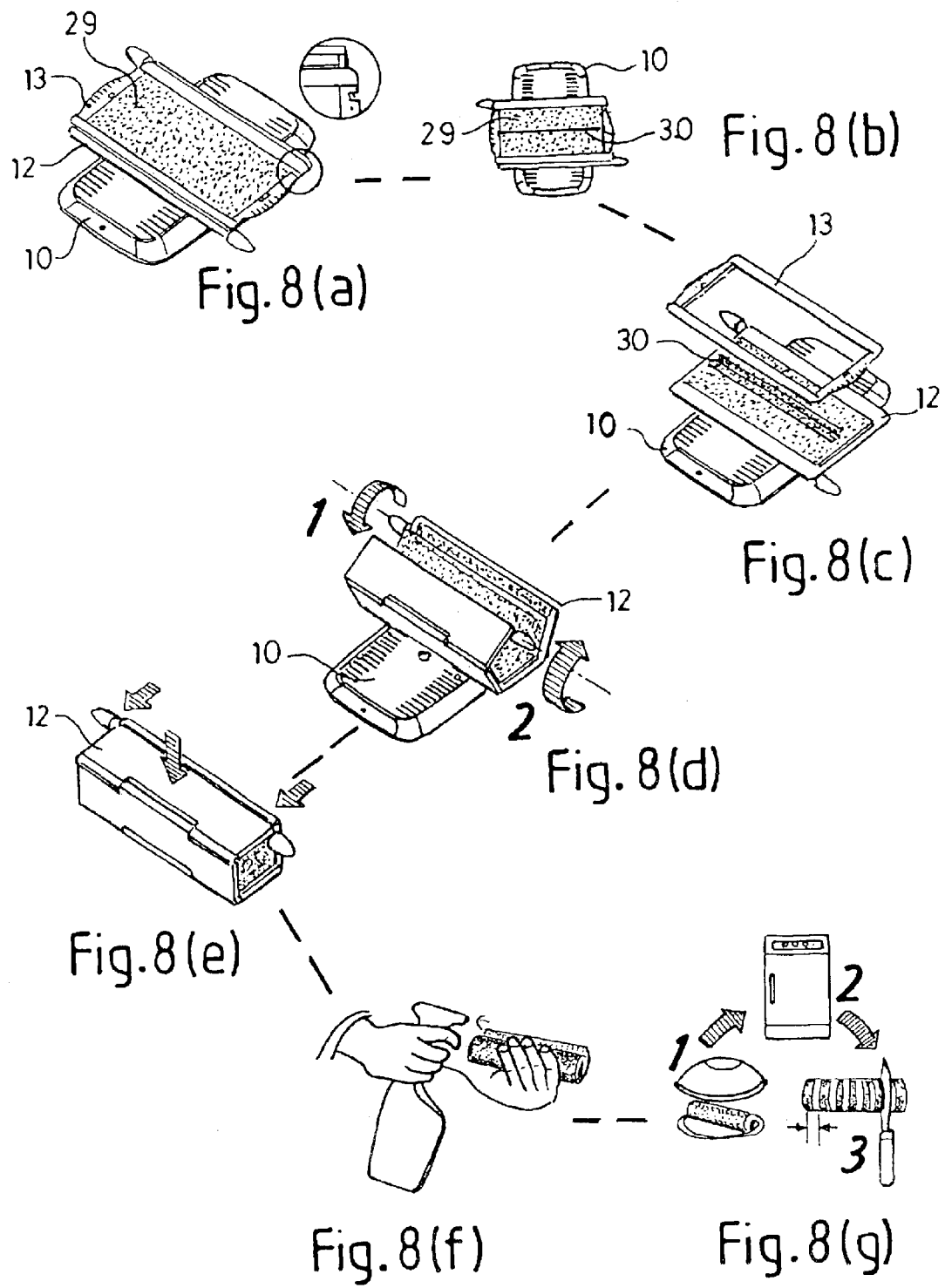
FIGS. 8a to 8g are a series of views illustrating the operational stages in the production of small rolls (Hosomaki)

FIGS. 8a to 8g show the operative stages in the use of the machine set up to make a small roll with two fillings. As shown in FIG. 8a, the smaller plate 12 is unfolded and located on the support base 10 in an orientation at right angles to its storage position of FIGS. 1 and 2. This location is assisted by the provision of locating projections on the underside of plate 12 at positions corresponding to holes in the support base 10. A nori (seaweed sheet) is cut in half and is placed on the plate 12. The frame members 13a to 13d are then assembled to make the frame 13 which is located on the plate 12 so that the numeral 2 appears beside the spigot 27. This indicates to the user that the machine is set up to make sushi rolls with two fillings, the frame presenting a shallower recess in order to accommodate the bulk of the two fillings. The recess defined by the frame is then filled with cooked rice 29 which is spread evenly and smoothed off so as to be flush with the upper edges of the frame 13, as illustrated in FIG. 8a. FIG. 8b shows the two fillings 30 added to the top surface of the rice 29. FIG. 8c illustrates how the frame 13 is then lifted off the plate 12, this operation being made easier by the shaping of the shorter frame members 13c, 13d and the ribs provided on the upper surfaces thereof. After removal of the frame 13, the plate 12 is folded, by use of the handles 16, as illustrated in FIG. 8d. When the plate is fully folded (FIG. 8e) the rice layer is folded around the fillings 30 and lightly compressed. After this, the plate 12 is unfolded, the sushi roll is removed from the plate 12 and the leading edge is lightly sprayed with water to seal the leading edge (FIG. 8f). The roll is then covered, refrigerated for about 30 minutes before the roll is cut into slices to form individual sushi rolls (FIG. 8g).

To make small rolls with one filling, the frame 13 is located on the plate 12 so that the numeral 1 appears beside the spigot 27. A single filling is added to the rice layer before roll formation which then proceeds in a similar manner to that illustrated in FIG. 8.

Figure 9:
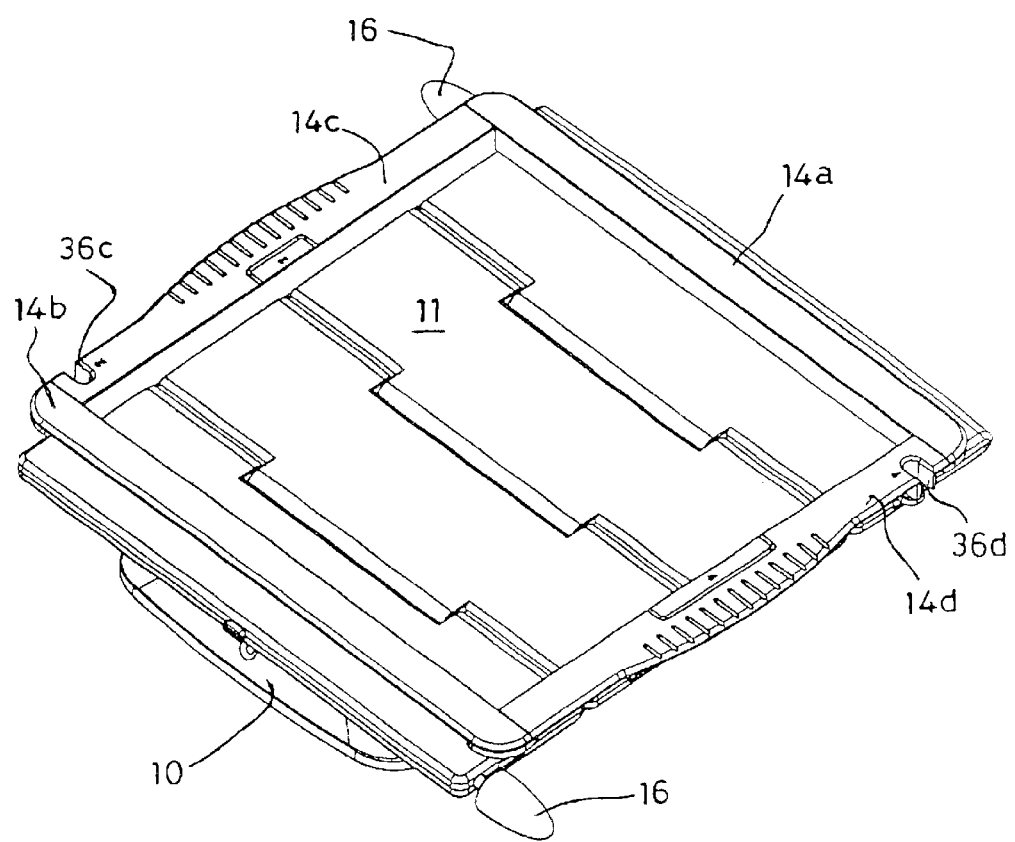
FIG. 9 shows the machine set up to make large sushi rolls (Futomaki)
Figure 10:
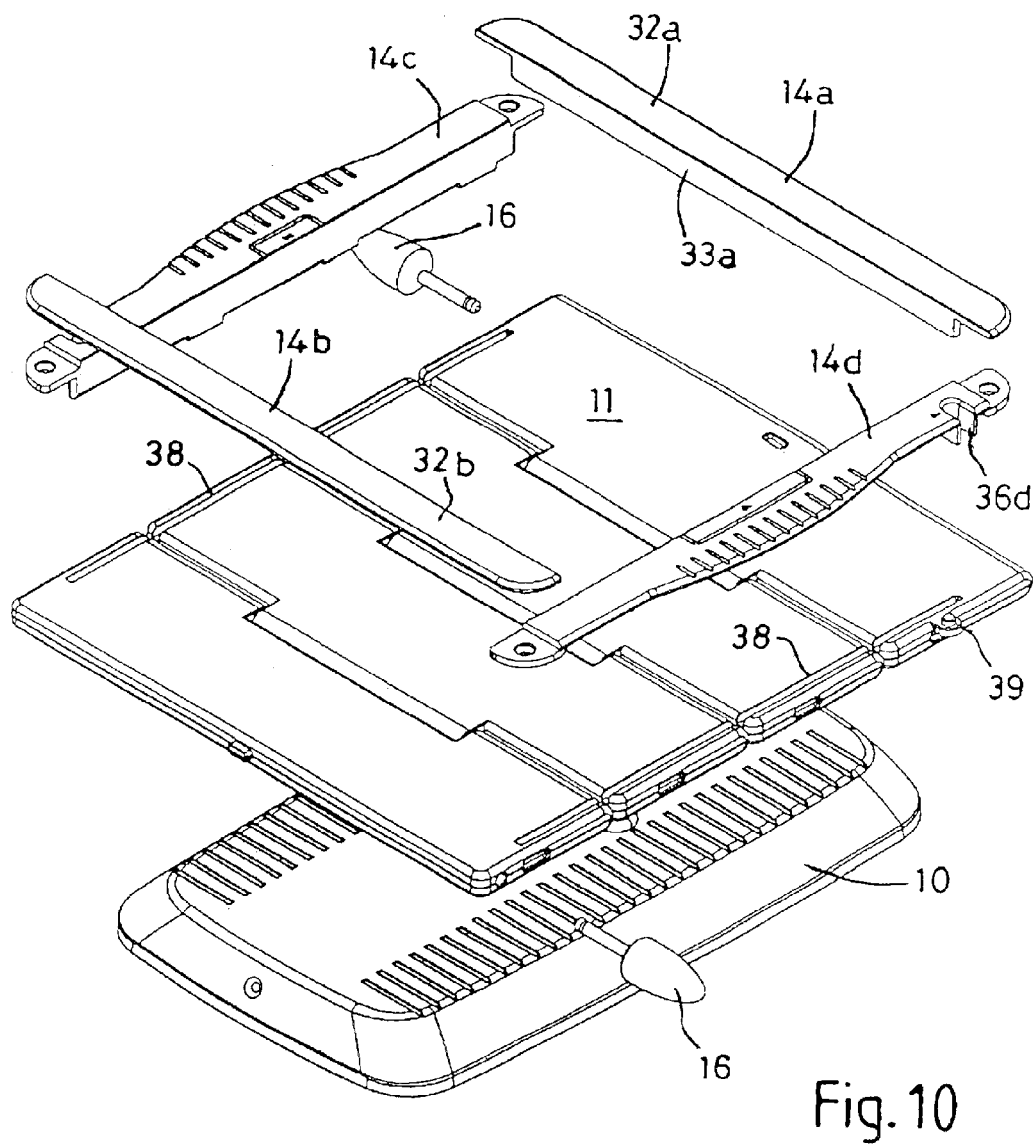
FIG. 10 shows the components of FIG. 9 in exploded view.
Figure 11:
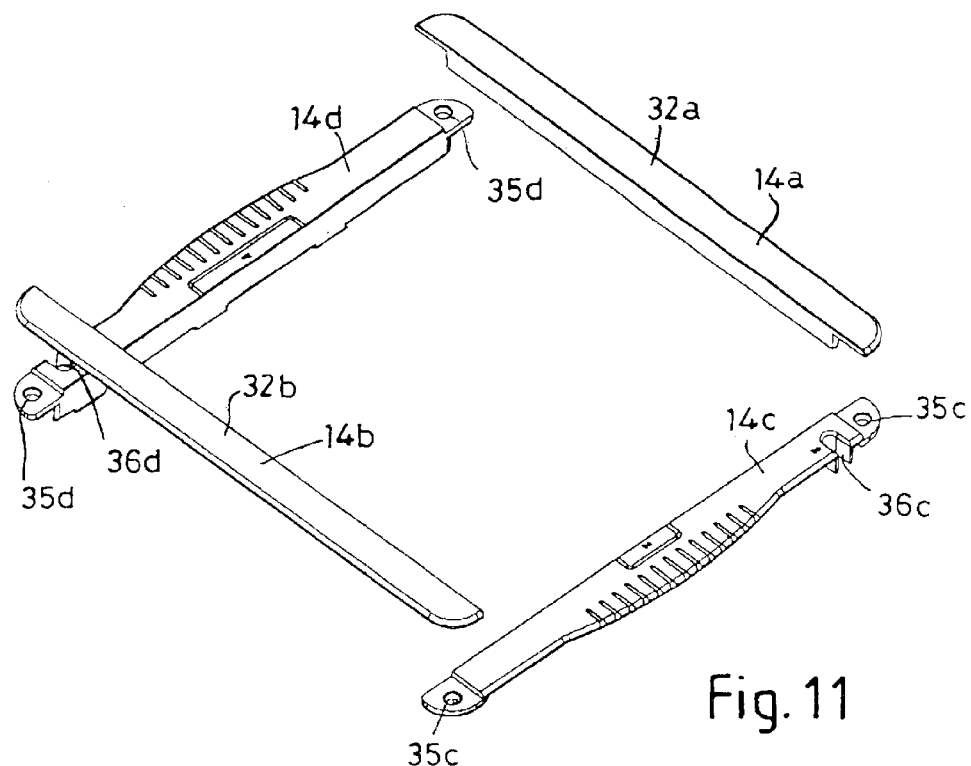
FIGS. 11 and 12 show four frame members used when making large rolls.
Figure 12:
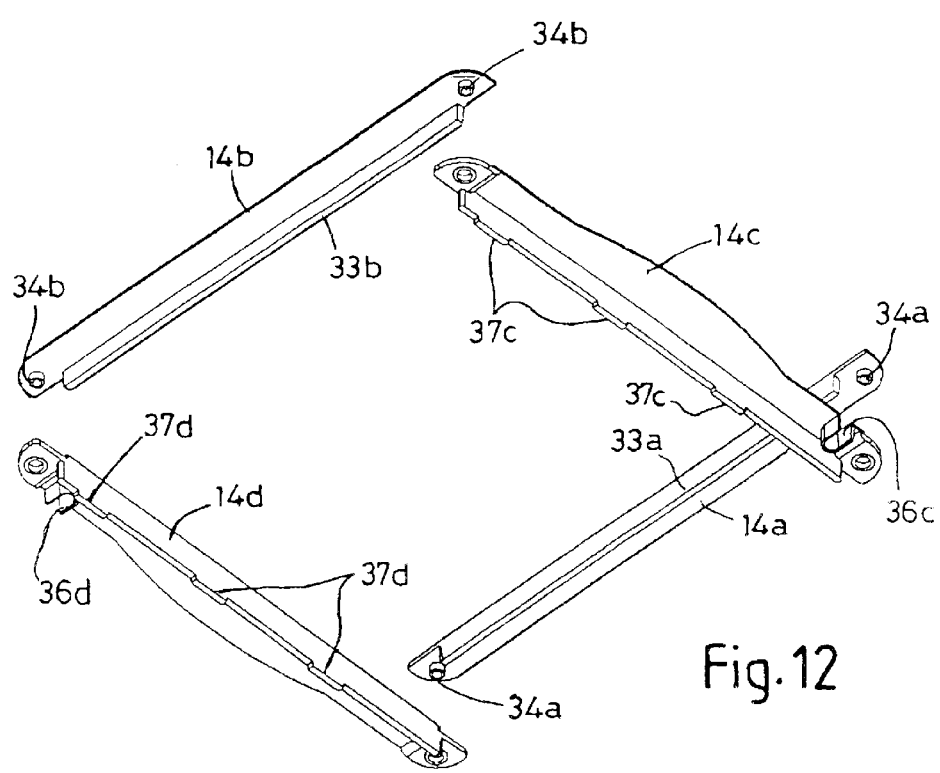

To make thick rolls, the larger plate 11 and the second frame members 14a to 14d are used instead of the smaller plate 12 and the frame members 13a to 13d. The larger plate 11 is similar in construction to the smaller plate 12 and has four members pivotally mounted one to the next along three parallel hinge lines. FIG. 9 shows the larger plate 11 unfolded and located on the support base 10, ready to make thick rolls. The four frame members 14a to 14d are similar to the frame members 13a to 13d but the frame members 14c, 14d are longer than the members 13c, 13d. Thus, the longer frame members 14a, 14b have upper flanges 32a, 32b, depending ribs 33a, 33b and boss-like projections 34a, 34b which fit within corresponding holes 35c, 35d in the ends of the shorter frame members 14c, 14d. The latter have slots 36c, 36d, with numeral 2 appearing beside slot 36c and at the mid point of member 14c and numeral 4 appearing beside slot 35d and at the mid point of member 14d. The members 14c, 14d have lugs 37c, 37d cooperable with recesses in grooves 38 (FIG. 10) in the plate 11, in a similar manner to that described to the members 13c, 13d and the plate 12.

The larger frame 14 made up of frame members 14a to 14d is locatable on the larger plate 11 in one or other of two alternative orientations in a manner corresponding to that described for the smaller frame. Thus, in the first orientation the frame 14 defines a shallower recess so that four fillings can be accommodated, this being indicated by the numeral 4 appearing beside the spigot 39 (FIG. 10) and at the centre of the member which is at the front of the machine. This orientation is illustrated in FIG. 9. In the alternative orientation, the spigot 39 engages the slot 36c so that the numeral 2 is prominent, to indicate that the machine is set up to make sushi rolls with two fillings.

The single machine described can thus be used to make small rolls with 1 or 2 fillings, or large rolls with 2 or 4 fillings.

What is claimed is:

1. A machine for making sushi rolls, the machine comprising a foldable plate and wall means capable of occupying two different orientations with respect to the plate, in the first orientation the wall means defining a shallow recess for receiving a thinner layer of cooked rice on the plate, and in the second orientation the wall means defining a deep recess for receiving a thicker layer of cooked rice on the plate, so that after removal of the wall means from the plate the latter can be folded to form a sushi roll having a thinner or thicker layer of cooked rice.

2. A machine according to claim 1, wherein the wall means comprise a pair of shallow walls to define the shallow recess and a further pair of deeper walls to define the deeper recess.

3. A machine according to claim 2, wherein the shallow walls form the mutually opposite walls of a shallow rectangular frame locatable on the plate and the deeper walls form the mutually opposite walls of a deeper rectangular frame locatable on the plate.

4. A machine according to claim 2, wherein the wall means comprise four walls defining a rectangular frame which is locatable on the plate in either of two alternative positions, giving differing depths of recess to define said orientations.

5. A machine according to claim 4, wherein in the first orientation lugs on the frame locate within grooves in the plate whereas in the second orientation the lugs do not locate within the grooves in the plate.

6. A machine according to claim 4, wherein the four walls are constituted by four elongate frame members.

7. A machine according to claim 6, wherein ends of the four frame members have cooperating formations to facilitate assembly of the frame.

8. A machine according to claim 7, wherein the formations are projections and recesses.

9. A machine according to claim 6, wherein the frame members, when separated from one another, are grouped into a bundle which is capable of being accommodated within the folded plate, in order to provide a compact and neat storage of the frame members when the machine is not in use.

10. A machine according to claim 1, wherein the machine carries visual indicator means to indicate to the user which of the two alternative orientations is assumed by the wall means.

11. A machine according to claim 10, wherein the plate has a projection and the wall means has two recesses one of which receives the projection in one orientation of the wall means and the other of which receives the projection in the other orientation of the wall means, the one recess carrying a first indicator representative of a small bulk of filling and the other recess carrying a second indicator representative of a larger bulk of filling.

12. A machine according to claim 11, wherein the first and second indicators are respective numerals.

13. A machine according to claim 1, wherein the machine has two plates of different areas when unfolded, each being provided with its respective wall means, the smaller plate and associated wall means being used to make small sushi rolls (Hosomaki) and the larger plate and associated wall means being used to make large sushi rolls (Futomaki).

14. A machine according to claim 13, wherein the smaller folded plate fits inside the larger folded plate with the wall means of both frames being locatable within the larger folded plate, to provide a compact assembly of components of the machine when the latter is not in use.

15. A machine according to claim 14, wherein the machine has a support base which carries the two folded plates with the wall members therewithin, each plate when unfolded being locatable on the support base.

* * * * *